Aug. 29, 1950  S. E. BERGMAR ET AL  2,520,489
MEANS FOR EXACT READING OF THE PHASE POSITION OF AN
ARBITRARY IMPULSE IN A PERIODICALLY
RECURRENT SERIES OF IMPULSES

Filed May 31, 1946  6 Sheets-Sheet 1

Sten Erik Bergmar
Folke Verner Kimblad
INVENTORS
By Otto Munk
their ATTY.

Aug. 29, 1950 S. E. BERGMAR ET AL 2,520,489
MEANS FOR EXACT READING OF THE PHASE POSITION OF AN
ARBITRARY IMPULSE IN A PERIODICALLY
RECURRENT SERIES OF IMPULSES
Filed May 31, 1946 6 Sheets-Sheet 3

Sten Erik Bergmar
Folke Verner Kimblad
INVENTORS

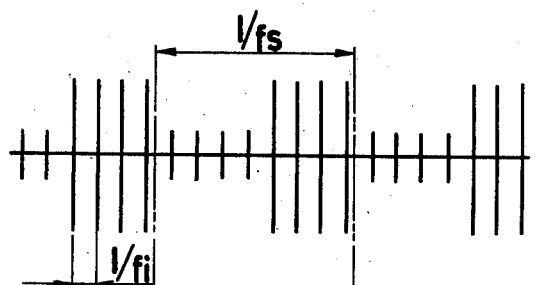
Fig. 8
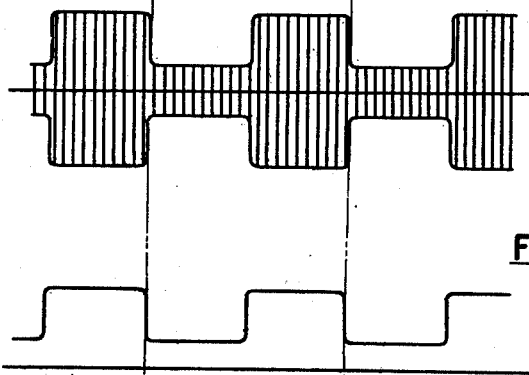
Fig. 9
Fig. 10
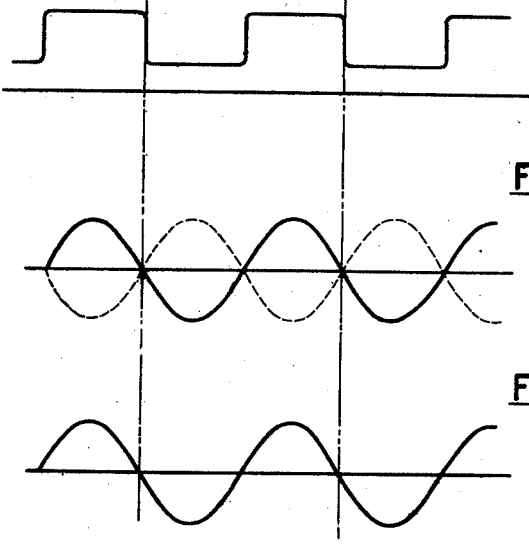
Fig. 11
Fig. 12

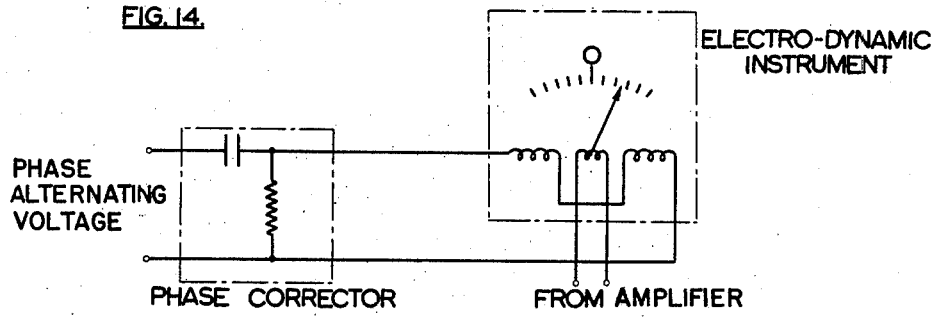
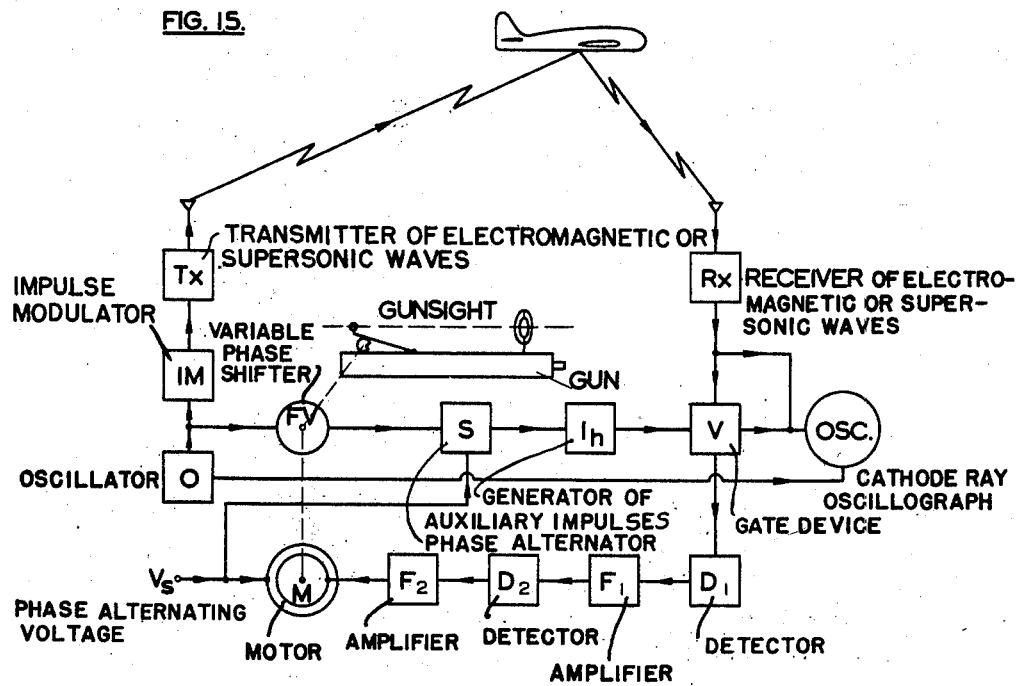

Patented Aug. 29, 1950

2,520,489

UNITED STATES PATENT OFFICE 2,520,489

MEANS FOR EXACT READING OF THE PHASE POSITION OF AN ARBITRARY IMPULSE IN A PERIODICALLY RECURRENT SERIES OF IMPULSES

Sten Erik Bergmar, Abrahamsberg, and Folke Verner Kimblad, Stockholm, Sweden

Application May 31, 1946, Serial No. 673,452
In Sweden July 29, 1944

Section 1, Public Law 690, August 8, 1946
Patent expires July 29, 1964

10 Claims. (Cl. 343—13)

The present invention relates to means for exact reading of the phase position of an arbitrary impulse in a series of impulses recurring periodically with a certain frequency, viz: the impulse frequency, which impulse series possibly after frequency transposition and amplification is fed into a normally blocked valve device provided with a device for releasing the blocking of the valve once in a definite regulatable phase position during each period—possibly every second period, every third period, and so on—the said means being characterised by a shifting device, by means of which the phase angle of the last mentioned phase position is caused to shift periodically between two adjacent values, in order that, when the phase position determining the release of the blocking has been regulated in such a way that the part of the impulse signal which passes the valve device, has the same amplitude in the two phase positions in which the blocking of the valve device is released, the sought phase position shall be the average of the phase angles for the two last memtioned phase positions.

By impulses in this case are to be understood short energy pulses of wave nature, e. g. electromagnetic or acoustic waves. A condition of the invention is that these impulses are built up of or converted into electric oscillations with a frequency, carrier frequency $f_b$, which is considerably higher than the frequency with which the impulse series recurs—the impluse frequency $f_i$. A further condition of the invention is that the duration of each impulse is very short in relation to the time of oscillation of the impulse frequency.

Figure 1:
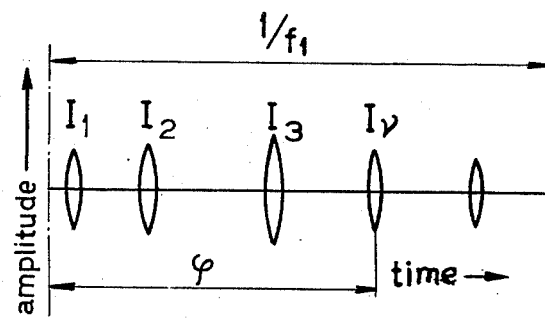
Figure 6:
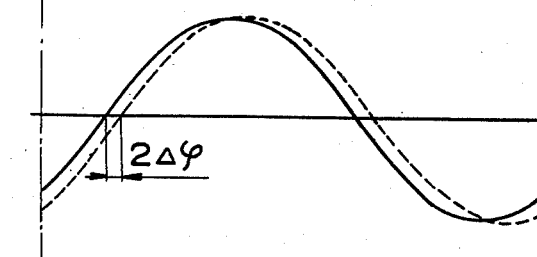
Figure 13:
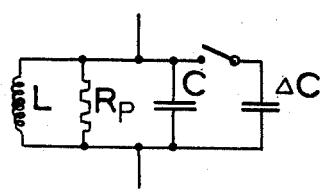
Figure 2:
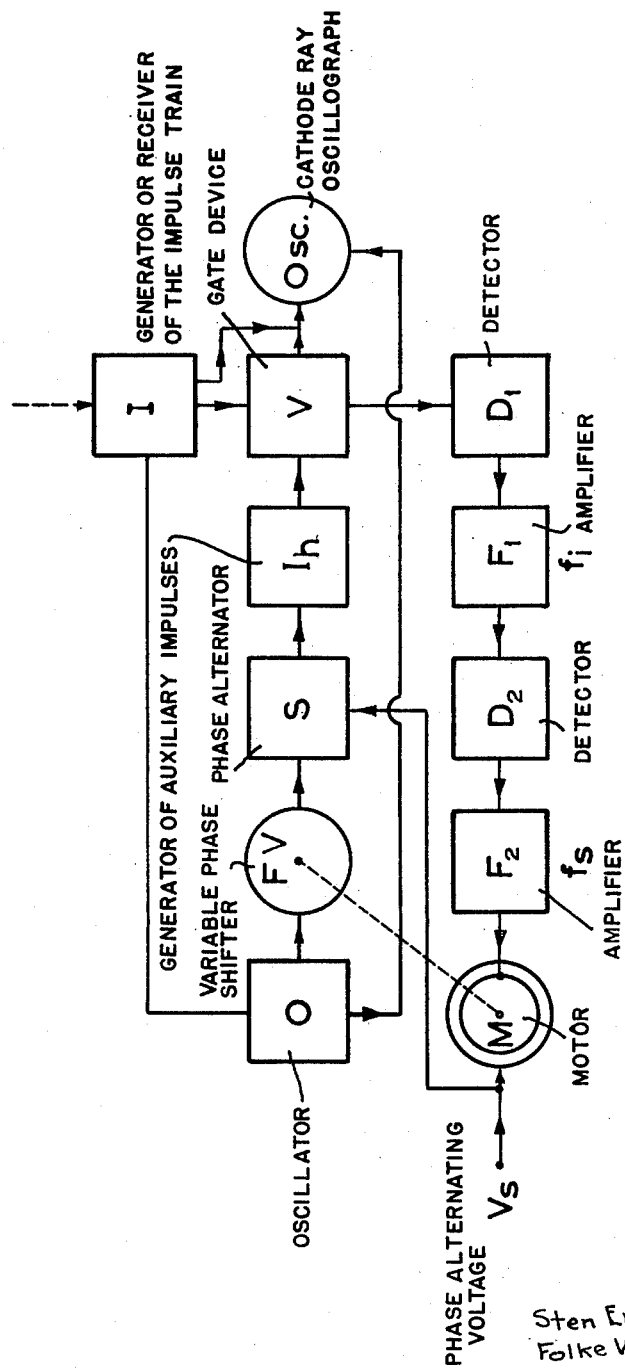
Figure 3:
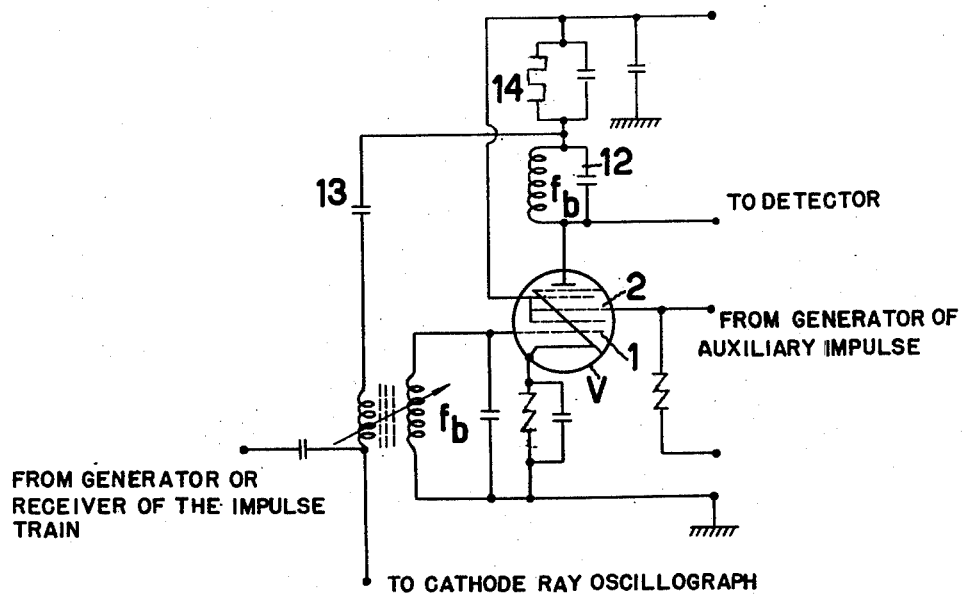
Figure 4:
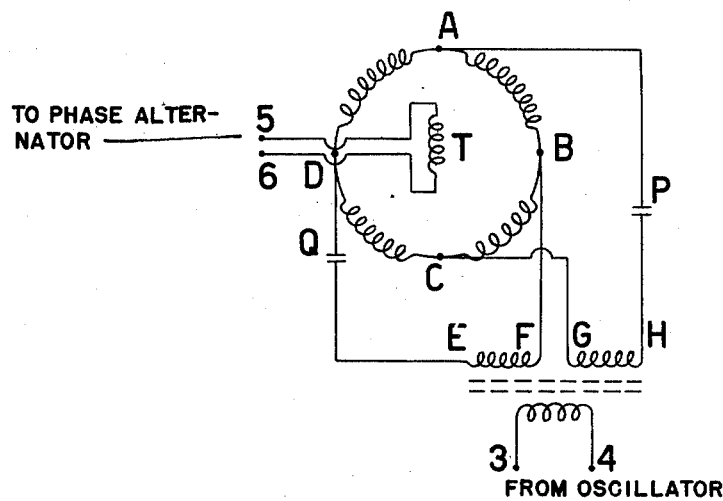
Figure 5:
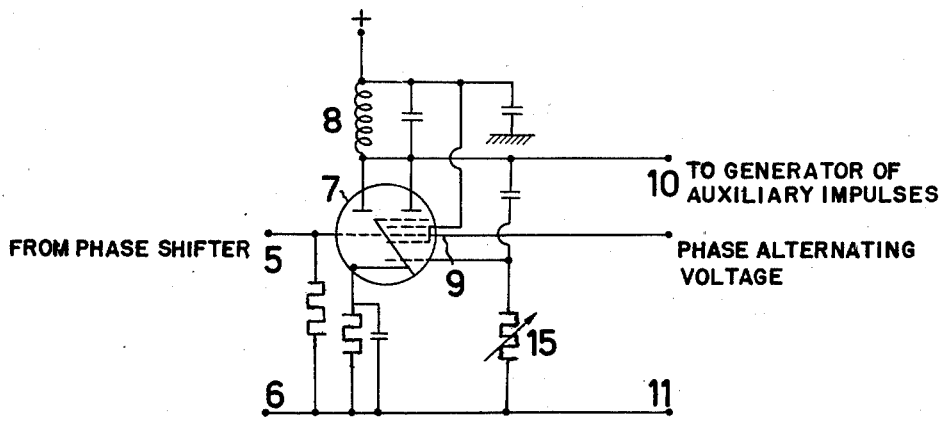

The invention is to be described more particularly hereinafter, reference being had to the accompanying drawings, in which Fig. 1, in the form of a diagram, shows a period of the impulse series extended along a horizontal time axis. Fig. 2 is a block diagram of an embodiment of the device according to the invention. Fig. 3 shows a circuit diagram of a valve tube included in the device according to the invention. Fig. 4 shows a phase shifter included in the device according to the invention. Fig. 5 shows a phase alternating member included in the device according to the invention. Figs. 6 to 12 are diagrams showing the aspect of the signals obtained at different points in the device according to Fig. 2. Fig. 13 shows an equivalent diagram for certain details in the device according to Fig. 5. The time scale in Figs. 8–12 is considerably diminished in relation to the same scale in Figs. 1, 6 and 7. Fig. 14 is a diagram of a modified detail, and Fig. 15 is a diagrammatic view of a modified arrangement.

In a known method for distance measuring by means of radio, impulses of short duration are transmitted, the said impulses being generated by a transmitter of (unmodulated) ultra-high-frequency electromagnetic waves in such a way that the transmitter is normally blocked but is periodically brought to oscillating condition a short moment thereby that a D. C. impulse releases the blocking. The generator of the D. C. impulses may be constructed in different ways, but as a rule it can be synchronised by an A. C. sine voltage, the frequency of which thus determines the number of transmitted impulses per second. The ultra-high-frequency signals are propagated rectilinearly in space, are reflected by one or more objects, return and are caught by a receiving aerial, are amplified and frequency transposed in a receiving device. The time required for the travel of the impulse to a reflecting object and back again is a measure of the distance from the transmitter-receiver-device to the object in question. The time difference between the signal coming direct from the transmitter to the receiver (the direct impulse) and the reflected signal (the reflex impulse) is measured in a known way by means of a cathode ray oscillograph, the time deflection of which has the same periodicity as the outgoing transmitter impulses (the impulse frequency $f_i$). This time difference is a fraction of the time between two consecutive transmitter impulses and can therefore be represented as a phase angle in the impulse cycle. Thus, the moment of arrival of the reflected impulse at the receiver corresponds to a certain phase position in the impulse cycle relative to the direct impulse if the latter is supposed to have the phase angle zero. In Fig. 1 the left limiting line thus represents the phase position of the direct impulse (the phase angle zero). The different impulses $I_1$, $I_2$, $I_3$ and so on thus originate from reflections against objects situated at different distances from the transmitter-receiver-device. The next direct impulse occurs at the right limiting line.

The device according to the invention has for its purpose to enable the measuring of the phase position of an arbitrary impulse in such an impulse train with greater exactness than what is possible with earlier known methods.

Distance measuring by means of radar is not the only case in which the apparatus can be used. There are also many other spheres in which an exact determination of the phase position of an impulse in an impulse train relative to a certain reference phase is desirable.

All the different impulses $I_1, I_2 \ldots I_n \ldots$ of the impulse train in Fig. 1 thus recur with the frequency $f_i$, below referred to as the impulse frequency, but have mutually different phases in the impulse cycle. For example, the phase position of the impulse $I_n$ in the impulse cycle is to be determined by the device according to the invention. In point of principle, this is brought about by suppressing the other impulses, while the just mentioned impulse $I_n$ is sorted out, whereafter the signal thus obtained can be further treated.

The mentioned separation and treatment of the impulse $I_n$ is effected by means of the device according to the invention, a block diagram of the said device being shown in Fig. 2.

I indicates a generator for the impulses of the impulse series, or I is a receiver for the impulses generated and transmitted at another place. A synchronising impulse is led from an oscillator O to the member I, or a synchronising impulse arrives at O from I according as the impulses are generated at I or arrive at I from outside. The signal coming from I and containing the different impulses can be indicated by a cathode ray oscillograph Osc. The time deflection of the cathode ray oscillograph is synchronised from the oscillator O.

There are devices in which transmitter and receiver are placed at different places. In this case the oscillator O in the device according to the invention can be synchronized by a separate synchronising impulse in the received signal so that the frequency of the oscillator will correspond with the frequency of the impulses series and so that the oscillator voltage obtains a phase position fixed by the synchronising impulse. In the block diagram in Fig. 2 I in this case indicates a receiver only. In the case of radar and similar devices where transmitter and receiver are at the same place, I represents the whole transmitter-receiver-device. The impulsed transmitter is here synchronized from the oscillator O so that the transmitter impulse obtains a definite phase position in relation to the voltage generated by the oscillator.

Moreover, after suitable frequency transposition and amplification the signal from I is supplied to the input grid of an amplifier tube V shown more particularly in Fig. 3, hereinafter called the valve tube. The valve tube V is provided with a blocking grid 2, upon which normally such a negative bias is impressed that the tube is blocked and thus does not let the signals pass.

The A. C. sine voltage generated by the oscillator O and synchronised with the impulse frequency $f_i$, i. e. the number of periods which indicates how many times per second the impulse recurs, is supplied to the inputs 3 and 4 of a phase shifter FV, the particular construction of which will be seen from Fig. 4. The object of the phase shifter is to enable a continuous displacement of the phase of the A. C. sine voltage from 0° to 360° without simultaneous variation of the amplitude of the A. C. voltage at the output terminals of the phase shifter. The phase shifter FV has a stationary part ABCDA and a part T turnable therein. The stationary part consists of a cylindric drum-wound coil with four symmetrically located taps A, B, C, and D. A rotating flux of constant amplitude is to be obtained within the said coil. In order to obtain this flux, a current is supplied to the terminals A and C, the said current being in phase quadrature with respect to time in relation to another current which is supplied to the terminals B and D, the said terminals being located at right angles in the space in relation to the terminals A and C. This is obtained thereby that the inductance of the coil ABCDA, viewed from the terminals A and C, in series with the capacitance of the condenser P forms a series-resonant circuit which is detuned +45°, while the inductance of the coil ABCDA viewed from the inputs B and D, in series with the capacitance of the condenser Q forms a series-resonant circuit which is detuned −45°.

As will be seen from Fig. 4 and from what has been mentioned above the stator can be divided into four equal windings A—B, B—C, C—D and D—A which are located at right angles to each other. If it is supposed that each of the said windings has the loss resistance R and the inductance L, the impedance, measured between the taps A—C or B—D becomes equal to $$\tfrac{1}{2}(R+j\omega L+R+j\omega L)=R+j\omega L$$

$\omega$ being $2\pi$ times the frequency of the supplied voltage. If it is further supposed that the capacitance of the condensers P and Q is $C_p$ and $C_q$ respectively, the impedances, measured between the points G—H and the points E—F respectively become:

$$R+j\omega L+1/j\omega C_p = R+j(\omega L - 1/\omega C_p) = R+jX_p$$

and $$R+j(\omega L - 1/\omega C_q) = R+jX_q$$

respectively. $C_p$ and $C_q$ are selected in such a way that the reactances $X_p$ and $X_q$ both become numerically equal to the resistance R but in such a way that $X_p$ is inductive while $X_q$ is capacitive. Thus $X_p = -X_q = R$.

The impedances across G—H and E—F thus become $R/1+j/$ and $R/1-j/$ respectively. Viewed from the primary terminals 3—4 of the transformer these impedances are connected in parallel, and the transferred impedance thus becomes $$n^2 \cdot \frac{R(1+j) \cdot R(1-j)}{R(1+j) + R(1-j)} = n^2 \cdot R$$

$n$ being the transformation ratio of the transformer. In the coil ABCDA there is turnably mounted a rotor T with a simple drum-winding. An A. C. sine voltage is induced in the drum-winding T by the rotating magnetic flux in the coil ABCDA. By turning the rotor around its axis which is arranged coaxially with the centre line of the coil ABCDA the phase of the voltage obtained between the terminals 5 and 6 of the rotor can be turned in relation to the voltage supplied to the phase displacer between the terminals 3 and 4 over a range comprising 360°. The phase angle between the two just mentioned voltages is here indicated directly by the angle of rotation of the rotor T.

According to the invention the sine potential obtained between the terminals 5 and 6 in the phase shifter FV is now supplied to a device S, here called phase alternator. The particular construction of the phase alternator is clear from Fig. 5. The phase alternator contains a double tube 7. The terminals 5 and 6 of the phase shifter are connected to the input circuit of the triode part of the said double tube. The sine voltage from the phase shifter, the phase of which voltage has been shifted by the angle $\varphi$ in the phase shifter in relation to the A. C. voltage fed into the phase shifter from the oscillator O is hereby amplified in the triode part. The anode circuit of the triode part consists of an resonant circuit 8 tuned to the impulse frequency $f_1$. The other part of the double tube 7 consists of a heptode tube connected as a reactance tube. The heptode part of the double tube is, in the way shown in Fig. 5, connected in parallel with the just-mentioned resonant circuit 8. The reactance of the heptode part is caused to alternate between two values thereby that an A. C. voltage $V_s$, for example of the frequency 50 cycles per second (C./S.), the modulating frequency is fed into the injector grid 9 of the heptode part. This A. C. voltage has a relatively great amplitude, and therefore the anode current of the heptode part becomes blocked during the greater part of the negative half period of the A. C. voltage. During the positive half period, on the other hand, the injector grid has no appreciable influence upon the anode current of the heptode part. The mutual conductance of the heptode part will thus alternate between a certain zero and a certain rather constant value. The equivalent reactance of the heptode part will thus alternate between an infinite value and a certain finite value. This varying reactance is in parallel across the tuned anode circuit. This resonant circuit has initially been slightly detuned in such a way, that the resultant anode impedance will alternate between two values, viz.

$$r+jX = |Z|e^{i\Delta\varphi}$$

and $$r-jX = |Z|e^{-i\Delta\varphi}$$

expressed in generally accepted terms. The phase of the A. C. voltage obtained from the double tube 7 between the terminals 10 and 11 will in this case alternate between the value $\varphi+\Delta\varphi+180°$ and $\varphi-\Delta\varphi+180°$. The aspect of this A. C. voltage is clear from Fig. 6, in which the full line shows the voltage in one phase position and the dashed line shows the voltage in the other phase position. The value of $\Delta\varphi$ is regulatable by the variable resistance 15.

$|Z|$ mentioned above is the absolute value of the equivalent anode impedance and $\Delta\varphi$ is its phase angle. $r$ and $X$ are the resistive and reactive components, respectively, of $|Z|$ and have no direct physical correspondence. Mathematically, the expressions can be deduced in the following way. It is explained above how the equivalent reactance of the reactance valve is caused to alternate between an infinite value and a certain finite value. In the diagram according to Fig. 5 this reactance becomes capacitive and can be represented by a condenser which shunts the anode circuit 8 and has a capacitance alternating between zero and a certain value $\Delta C$. If it is further supposed that the coil 8 has the inductance L and the series resistance $R_s$ and that the condenser has the capacitance C, the equivalent diagram shown in Fig. 13 is obtained.

In Fig. 13 is $$R_p \sim \frac{(\omega L)^2}{R_s}$$

The admittance of the circuit thus becomes:

$$Y_1 = 1/R_p + j(\omega C - 1/\omega L) = K + jG_1$$

and $$Y_2 = 1/R_p + j[\omega(C+\Delta C) - 1/\omega L] = K + jG_2$$

respectively, where $G_1$, and $G_2$ respectively, is the susceptance in both cases.

If now L is adjusted in such a way that $$G_2 = -G_1 = G$$

there is obtained $$Y_1 = K - jG = |Y| \cdot e^{-i\Delta\varphi}$$

and $$Y_2 = K + jG = |Y| \cdot e^{i\Delta\varphi}$$

where $$|Y| = \sqrt{K^2 + G^2}$$

and $$\Delta\varphi = \text{arctg } G/K$$

The corresponding impedances thus become $$Z_1 = 1/Y_1 = |Z| \cdot e^{i\Delta\varphi}$$

and $$Z_2 = 1/Y_2 = |Z| \cdot e^{-i\Delta\varphi}$$

The angle addition of 180° in the two expressions $\varphi+\Delta\varphi+180°$ and $\varphi-\Delta\varphi+180°$ emanate from the phase shifts in the triode part of the valve 7.

The sine voltage obtained from the terminals 10—11 in Fig. 5 will thus get a phase angle relative to the original oscillator voltage which during one half cycle of the modulating frequency has the value $\varphi+180°+\Delta\varphi$ and during the other half cycle has the value $\varphi+180°-\Delta\varphi$. The angle $\varphi$ is here determined by the setting of the phase shifter. This voltage is caused to control a generator $I_h$, which generates positive D. C. impulses $I_h$ of short duration, in such a way that such an impulse appears at a certain moment each cycle. The D. C. impulses are impressed upon the injector grid 2 of the valve tube, see Fig. 3, which has such a great negative bias that the valve is blocked except during the short intervals during which the D. C. impulse $I_h$ lasts. At the control grid 1 of the valve tube there arrives from I a signal composed of a train of high frequency impulses of short duration with the carrier frequency $f_b$. The impulse series recurs with a frequency of $f_1$ pulses per second (P. P. S.). If the D. C. impulse from $I_h$ occurs midway between two high-frequency impulses, no signal will be let through to the anode circuit of the valve tube V. If, on the other hand, the phase position of the D. C. impulse $I_h$ is set by means of the phase shifter so that the said impulse quite or partially coincides with one of the impulses in the impulse train with respect to time, oscillations will be generated in the anode circuit 12 during the time, the collision time, during which the D. C. impulse and the high-frequency impulse simultaneously are at hand. Thus, by releasing the blocking of the valve tube, the D. C. impulse $I_h$ forms a gate for the high frequency impulse $I_n$. Now as the phase position of the D. C. impulse alternates with the modulating frequency $f_s$ between two adjacent positions, the collision times in the two positions will generally become unequal, and therefore the energy quantity transferred every impulse cycle to the anode circuit 12 becomes unequal during the two half periods of the modulating frequency. The signal occurring in the circuit 12 will thereby be modulated with the modulating frequency $f_s$ in the way shown in Fig. 8. Only if the phase position of the high-frequency impulse is the average of the two phase positions of the auxiliary impulses $I_h$ the signal in the circuit 12 will be equal during the two half periods and thus there occurs no modulation. The voltage pulses obtained in the anode circuit across the resistance 14 are led via a condenser 13 to the cathode ray oscillograph Osc.

Figure 7:
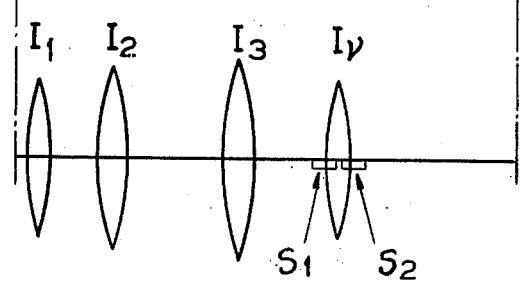

The image obtained on the screen of the cathode ray oscillograph Osc is shown in Fig. 7. The just mentioned voltage pulses which are led to the vertical deflecting system of the oscillograph appear as notches $L_1$ and $L_2$ respectively in the zero line. The distance between these notches is regulated by means of the above mentioned variable resistance 15 included in the phase alternator. On the screen of the cathode ray oscillograph there are also copied the different impulses $I_1, I_2 \ldots I_n$ and so on coming from I. By means of the cathode ray oscillograph Osc the phase position of the auxiliary impulse $I_h$ can thus be visually estimated in relation to the different impulses of the impulse train.

The signal which is obtained across the resonant circuit 12, consists of the impulse $I_n$ sorted out according to the above. Fig. 8 shows diagrammatically the aspect of this signal in the case in which the phase position of the auxiliary impulse $I_h$ lies somewhat laterally of the phase position of the impulse $I_n$, a certain modulation with the shift frequency $f_s$ being obtained.

The just mentioned signal is led to a detector $D_1$ with such a time constant that an A. C. voltage of the frequency $f_i$ arises. This A. C. voltage is amplified in an amplifier $F_1$ tuned to the impulse frequency. After the amplifier $F_1$ the signal has the aspect shown in Fig. 9. This signal is rectified in the detector $D_2$, the pulsating D. C. voltage obtained from this detector getting the aspect shown in Fig. 10. This pulsating D. C. voltage is led to an amplifier $F_2$ tuned to the modulating frequency $f_s$, the A. C. voltage coming from the said amplifier obtaining the aspect shown in a full line in Fig. 11. If instead thereof the phase shifter had been equally displaced from the coincidence value in the opposite direction, the A. C. voltage would have obtained the aspect shown by the dashed line in Fig. 11.

In order to elucidate Fig. 8 the following example can be given. It is supposed that the following representative values are at hand: Carrier frequency $f_b = 10M$ C./S., the impulse frequency $f_i = 10,000$ P. P. S., the modulating frequency $f_s = 50$ C./S., the duration of the impulses 1 $\mu$s. The time for an impulse period thus becomes 100 $\mu$s., and each impulse takes up $1/100$ of the impulse cycle only. Each high frequency impulse consists of 10 carrier frequency cycles. During each half cycle of the modulating frequency 100 impulses are let through. Thus, each stroke in Fig. 8 represents 10 oscillations of the frequency 10M C./S. at the most. The number of strokes in the time $1/f_s$ would in this case be 200. The signal represented by Fig. 9 consists of oscillations of the frequency 10,000 C./S. modulated with 50 P. P. S. The frequency of the voltages according to Figs. 10 and 11 is 50 P. P. S.

This A. C. voltage shown in Fig. 11 is impressed upon one winding of an electrodynamic pointer instrument of the zero center type, upon the other winding of which the modulating voltage $V_s$ is impressed. The aspect of this latter voltage is clear from Fig. 12. As the voltages in Figs. 11 and 12 should be of the same or opposite phase in relation to one another the voltage $V_s$ should preferably be made to pass a phase corrector before being fed into the instrument. The instrument will now deflect in one direction or the other depending upon in which direction of the selected impulse $I_n$ the phase shifter FV is displaced. When, on the other hand, the phase shifter has been correctly set, the voltage amplified by the amplifier will have zero amplitude and the pointer of the instrument will not be actuated at all. This modification is illustrated by Fig. 14.

Thus, using the just mentioned instrument as zero indicator the phase position of the phase shifter can be turned manually so as to correspond exactly to the phase position of the selected impulse $I_n$.

The device now described can be completed so that the just mentioned adjustment of the phase position of the phase shifter FV can be effected automatically. The voltage obtained from the amplifier $F_2$ is impressed upon one of the two windings of a commutator motor M, while the modulating voltage $V_s$ is impressed upon the other winding of the motor. The torque of the motor is transferred in a suitable way to the shaft of the phase shifter. The motor is connected in such a way that the motor strives to turn the phase shifter towards the position of equilibrium. If the phase angle of the selected impulse $I_n$ is changed continuously with time, the phase shifter will automatically follow this movement. Naturally, the phase shifter must first be turned manually so that its phase position at least approximately corresponds with the phase position of the impulse $I_n$ whereafter the motor M can take over the further operation of the phase shifter.

The invention is, for example, intended to be used in devices for distance measuring according to the echo principle, e. g. radio ranging and echo sounding. By means of echo radio, distances in the space can be measured, for example the altitude of an aircraft above the ground or the distance of the aircraft from other aircrafts. This modification is illustrated in Fig. 15. The aircraft is for this purpose provided with a transmitter $Tx$ controlled by the oscillator O, and an impulse modulator $I_n$, the said transmitter radiating impulses of short duration with a periodicity of $f_i$ impulses per second. These impulses are reflected against different objects, such as other aircraft, the ground and certain objects in the field. The reflected impulses are received by the receiver $Rx$. The other symbols in Fig. 15 have the same significance as in Fig. 2. If the distance to such a reflecting object is to be measured, the phase shifter FV is set on such a value that the auxiliary impulse coincides with the impulse returning from the object in question. The transit time for the impulses makes itself noticeable as a phase shift from the direct impulse. This phase shift, the size of which is direct proportional to the distance to the object in question, is measured exactly by means of the device according to the invention. By means of the automatic device the phase shifter can be made to follow the variations in the distance to the object in question. For this purpose the shaft of the phase shifter can be connected to the distance setting device of the sight (Fig. 15) of a gun or the like, whereby the distance adjustment of the said sight will be able to follow automatically the varying distance to the selected target. Another range of use for the device according to the invention similar to the one just mentioned, is so-called echo-sounding apparatus using supersonic waves.

Having now described our invention, what we claim as new and desire to secure by Letters Patent is:

1. Means for accurately measuring the phase position of an arbitrary impulse in a periodically recurring series of impulses, comprising a source of reference signals of the said impulse frequency, means for continuously shifting the phase of the reference signal through the range of a complete cycle of the impulse frequency, means for alternating the phase angle of the said phase shifted signal between two adjacent positions periodically by means of a controlling voltage, means for converting the said phase shifted and phase alternating signal into short unidirectional impulses, means for applying the said unidirectional impulses to a normally blocked valve device in such a way, that the blocking of the valve is released every time a unidirectional impulse occurs, means for applying also the original impulse train, containing the selected impulse, the phase position of which is to be measured, to the said valve device in such a way that a signal is obtained at the output terminals of the valve device only if an impulse of the said impulse train happens to coincide in time entirely or partially with the said releasing impulse, in which case the said signal generally has different strength during the two half periods of the phase controlling voltage, and means for comparing said different signal strengths in the said two half periods in order to enable the adjustment of the phase shifter in such a way, that the said signal strength in one half period becomes equal to the signal strength in the other half period, in which case the reading of the phase shifter is a measure of the sought phase angle.

2. Means for accurately measuring the phase position of an arbitrary impulse in a periodically recurring series of impulses, comprising a source of reference signals of the said impulse frequency, means for continuously shifting the phase of the reference signal through the range of a complete cycle of the impulse frequency, means for alternating the phase angle of the said phase shifted signal between two adjacent positions periodically by means of a controlling voltage, means for converting the said phase shifted and phase alternating signal into short unidirectional positive impulses, an electron tube provided with an input grid fed by the original impulse train, and having an anode circuit, arranged to respond to the impulse signal, and a blocking grid normally biased by a negative voltage, which blocks the tube, means for impressing upon the blocking grid the said positive voltage impulses which release the blocking, whereby a signal is to be obtained in the anode circuit of said electron tube only if an impulse of the said impulse train happens to coincide in time entirely or partially with the said releasing impulse, in which case the said signal generally has different signal strengths in the said two half periods in order to enable the adjustment of the phase shifter in such a way that the said signal strength in one half period becomes equal to the signal strength in the other half period, in which case the reading of the phase shifter is a measure of the sought phase angle.

3. Means for accurately measuring the phase position of an arbitrary impulse in a periodically recurring series of impulses, comprising an oscillator of sine reference signals of the said impulse frequency, means for continuously shifting the phase of the reference signal through the range of a complete cycle of the impulse frequency, an electron tube, connected as a reactance tube, and a parallel resonant circuit, in which the said sine reference voltage is induced, the said reactance tube being connected to the said resonant circuit in such a way that the equivalent reactance of the reactance tube shunts the resonant circuit, and means for alternating the said equivalent reactance periodically between an infinite and a certain finite value by impressing a controlling alternating voltage, upon one of the grids of the reactance tube, thus causing the mutual conductance of the reactance tube to alternate between zero and a certain positive value and thereby alternating the phase angle of the phase shifted signal between two adjacent positions, means for converting the said phase shifted and phase alternating signal into short unidirectional impulses, means for applying the said unidirectional impulses to a normally blocked valve device in such a way that the blocking of the valve is released every time a unidirectional impulse occurs, means for applying also the original impulse train, containing the selected impulse, the phase position of which is to be measured, to the said valve device in such a way, that a signal is obtained at the output terminals of the valve device if an impulse of the said impulse train happens to coincide in time entirely or partially with the said releasing impulse, in which case the said signal generally has a different strength during the two half-periods of the controlling alternating voltage and means for comparing said different signal strengths in the said two half periods, in order to enable the adjustment of the phase shifter in such a way, that the said signal strength in one half period becomes equal to the signal strength in the other half period, in which case the reading of the phase shifter is a measure of the sought phase angle.

4. Means for accurately measuring the phase position of an arbitrary impulse in a periodically recurring series of impulses, comprising a source of reference signals of the said impulse frequency, means for continuously shifting the phase of the reference signal through the range of a complete cycle of the impulse frequency, means for alternating the phase angle of the said phase shifted signal between two adjacent positions periodically by means of a controlling voltage, means for converting the said shifted and phase alternating signal into short unidirectional impulses, means for applying the said unidirectional impulses to a normally blocked valve device in such a way, that the blocking of the valve is released every time a unidirectional impulse occurs, means for applying also the original impulse train, containing the selected impulse, the phase position of which is to be measured, to the said valve device in such a way that a signal is obtained at the output terminals of the valve device only if an impulse of the said impulse train happens to coincide in time entirely or partially with the said releasing impulse, in which case the said signal generally has different strength during the two half-periods of the phase modulating frequency, a detector which demodulates the signal obtained at the output terminals of the said valve device, and means for applying the demodulated voltage, the frequency of which is equal to the frequency of the controlling voltage, and the said controlling voltage to an indicating device, which is sensitive to the phase relation between an amplitude of the said two voltages.

5. Means as set forth in claim 4, wherein said indicating device comprises an electrodynamic device, one winding of which is supplied with the said demodulated voltage, while the other winding is supplied with the said controlling voltage in order that the direction and magnitude of the torque delivered by the electro-dynamic device may indicate the difference between the phase position of the selected impulse and the average value of the two phase positions in which the blocking of the valve device is released.

6. Means as set forth in claim 4, wherein the said indicating device comprises an electro-dynamic pointed instrument of zero center type, one winding of which is supplied with the said demodulated voltage, while the other winding is supplied with the said controlling voltage in order that the direction and magnitude of the deflection of the pointer may indicate the difference between the phase position of the selected impulse and the average value of the two phase positions in which the blocking of the valve device is released.

7. Means as set forth in claim 4, wherein said indicating device comprises an electric motor with two windings, one winding of which is supplied with the said demodulated voltage, while the other winding is supplied with the said controlling voltage in order that the direction and magnitude of the torque delivered by the motor may indicate the difference between the phase position of the selected impulse and the average value of the two phase positions, in which the blocking of the valve device is released.

8. Means as set forth in claim 4, wherein said indicating device comprises an electric motor with stator- and rotor-windings, one winding of which is supplied with the said demodulated voltage, while the other winding is supplied with the said controlling voltage, and wherein the shaft of the motor is mechanically coupled to the rotor of the phase shifter in order that the average phase position of the releasing impulse may be automatically adjusted to coincide with the phase position of the selected impulse in the impulse series.

9. Means for accurately indicating the distance to a reflecting object, comprising a transmitter radiating periodically recurring high frequency impulses, a receiver for receiving the said high frequency impulses after reflection against the said object, an impulse modulator, which modulates the said transmitter, a source of reference signals, which firstly controls the said modulator, secondly feeds a phase shifting device arranged to shift the phase angle of the said reference signal continuously through a complete cycle of the impulse frequency, means for alternating the phase angle of the said phase shifted signal between two adjacent positions periodically by means of a controlling voltage, means for converting the said phase shifted and phase alternating signal into short unidirectional impulses, means for applying the said unidirectional impulses to a normally blocked valve device in such a way, that the blocking of the valve is released every time a unidirectional impulse occurs, means for applying the received signal containing the reflected impulse to the said valve device in such a way, that a signal is obtained at the output terminals of the valve device only if an impulse of the received impulse train happens to coincide in time entirely or partially with the said releasing impulse, in which case the said signal generally has different strength during the two half periods of the controlling voltage, and means for comparing said different signal strengths in the said two half periods, in order to enable the adjustment of the phase shifter in such a way, that the said signal strength in one half period becomes equal to the signal strength in the other half period, in which case the reading of the phase shifter is a measure of the sought distance.

10. Means as set forth in claim 9, whereby the transmitter is arranged to transmit and the receiver is arranged to receive supersonic impulses.

STEN ERIK BERGMAR.
FOLKE VERNER KIMBLAD.

REFERENCES CITED

The following references are of record in the file of this patent:

UNITED STATES PATENTS

| Number | Name | Date |
| --- | --- | --- |
| 2,387,569 | Eggers | Oct. 23, 1945 |
| 2,403,527 | Hershberger | July 9, 1946 |
| 2,404,810 | O'Brien | July 30, 1946 |
| 2,405,238 | Seeley | Aug. 6, 1946 |
| 2,407,294 | Shockley | Sept. 10, 1946 |
| 2,422,074 | Bond | June 10, 1947 |
| 2,433,667 | Hollingsworth | Dec. 30, 1947 |

FOREIGN PATENTS

| Number | Country | Date |
| --- | --- | --- |
| 552,072 | Great Britain | Mar. 22, 1943 |